(12) United States Patent
Ban et al.

(10) Patent No.: US 7,203,573 B2
(45) Date of Patent: Apr. 10, 2007

(54) WORKPIECE TAKING-OUT APPARATUS

(75) Inventors: Kazunori Ban, Yamanashi (JP); Ichiro Kanno, Yamanashi (JP)

(73) Assignee: FANUC Ltd, Yamanashi (JP)

( * ) Notice: Subject to any disclaimer, the term of this patent is extended or adjusted under 35 U.S.C. 154(b) by 620 days.

(21) Appl. No.: 10/733,308

(22) Filed: Dec. 12, 2003

(65) Prior Publication Data
US 2004/0122552 A1   Jun. 24, 2004

(30) Foreign Application Priority Data
Dec. 13, 2002   (JP)   ............... 2002-362373

(51) Int. Cl.
  *G05B 15/00* (2006.01)
  *G05G 19/00* (2006.01)
(52) U.S. Cl. ............ 700/258; 700/245; 700/259; 318/568.1; 901/1
(58) Field of Classification Search ............ 700/245, 700/258, 259; 318/568.1; 901/1
See application file for complete search history.

(56) References Cited
U.S. PATENT DOCUMENTS

| | | | | |
|---|---|---|---|---|
| 4,146,924 | A * | 3/1979 | Birk et al. ............ | 700/259 |
| 4,412,293 | A * | 10/1983 | Kelley et al. ............ | 700/259 |
| 5,023,426 | A * | 6/1991 | Prokosch et al. ...... | 219/121.63 |
| 5,233,152 | A * | 8/1993 | Prokosch et al. ...... | 219/121.63 |
| 5,446,835 | A * | 8/1995 | Iida et al. ............ | 700/259 |
| 5,579,415 | A * | 11/1996 | Takano et al. ............ | 382/282 |
| 6,141,863 | A * | 11/2000 | Hara et al. ............ | 29/714 |
| 6,301,763 | B1 * | 10/2001 | Pryor ............ | 29/407.04 |

(Continued)

FOREIGN PATENT DOCUMENTS

| | | |
|---|---|---|
| EP | 1 043 642 A2 | 10/2000 |
| JP | 04-030991 | 2/1991 |
| JP | 03-202290 | 9/1991 |

(Continued)

OTHER PUBLICATIONS

Martens et al. A friend for assisting handicapped people, 2001, IEEE, p. 57-65.*

(Continued)

*Primary Examiner*—Thomas Black
*Assistant Examiner*—McDieunel Marc
(74) *Attorney, Agent, or Firm*—Staas & Halsey LLP (57) ABSTRACT

A workpiece taking-out apparatus performs snap with a camera of a three-dimensional visual sensor in a robot position for snap and captures an image in a personal computer. The workpiece taking-out apparatus detects workpieces to find a line of sight of the camera for each workpiece, decides an area for height measurement by a range finder to save height data in the area, and finds an intersection of line of sight data of the camera and height distribution for each detected workpiece to find a posture of the workpiece from the height data around it. Then, the workpiece taking-out apparatus decides a workpiece to be taken out this time from the position and the posture and decides a measurement position of the three-dimensional visual sensor close to the workpiece. In the measurement position, the workpiece taking-out apparatus performs main measurement by the three-dimensional visual sensor to decide a robot position for taking out a workpiece through check of the possibility of interference and execute taking-out of the workpiece in the robot position for taking out a workpiece through check of the possibility of interference again.

7 Claims, 4 Drawing Sheets

U.S. PATENT DOCUMENTS

| | | | |
|---|---|---|---|
| 6,592,315 B2* | 7/2003 | Osborne, Jr. | 414/9 |
| 6,763,284 B2* | 7/2004 | Watanabe et al. | 700/264 |
| 6,845,296 B2* | 1/2005 | Ban et al. | 700/245 |
| 7,123,992 B2* | 10/2006 | Ban et al. | 700/258 |

FOREIGN PATENT DOCUMENTS

| | | |
|---|---|---|
| JP | 09-277184 | 10/1997 |
| JP | 10-315174 | 12/1998 |
| JP | 2002-094374 | 4/2000 |
| JP | 2000-288974 | 10/2000 |
| JP | 2001-179677 | 7/2001 |

OTHER PUBLICATIONS

Yong et al., Roto task execution with telepresence using virtual reality technology, 1998, Internet, p. 1-8.*

Notice of Reasons for Rejection for corresponding Japanese Application No. 2002-362373 dated Mar. 1, 2005.

EP Search Report for corresponding application Ep 03247763.7-1239 dated Nov. 16, 2006.

* cited by examiner

WORKPIECE TAKING-OUT APPARATUS

BACKGROUND OF THE INVENTION

1. Field of the Invention

The present invention relates to a workpiece taking-out apparatus which has a three-dimensional visual sensor mounted on a robot, recognizes a position and a posture of a workpiece existing in a container with an opening, and takes out the workpiece on the basis of the position and the posture.

2. Description of the Related Art

For example, there is widely known a method of acquiring, with respect to a plurality of workpieces contained in a basket-like container in an unpackaged state, data of a height distribution in a three-dimensional spatial area occupied by the workpieces (hereinafter referred to as "existing area of workpieces") using a range finder or a three-dimensional visual sensor which projects pattern light. In addition, there has been proposed quite a few applications which use the height distribution data acquired by the method. As an example of such applications, there is a research for grasping the height distribution as an image (distance image) to perform object recognition on the basis of the image.

However, an example of such a research put in practice is hardly found. On the other hand, concerning taking-out of unpackaged workpieces, although examples of researches are found here and there, there are very few examples of researches put to practical use. Prior art relating to these techniques is indicated in, for example, Japanese Patent Application Laid-Open No. 9-277184 and Japanese Patent Application Laid-Open No. 10-315174.

Incidentally, there are several factors which make it difficult to put taking-out of unpackaged workpieces in practice. Among them, major factors are as described below.

Factor 1: A large number of unpackaged workpieces generally exist in a three-dimensionally irregular arrangement. If sensing is performed by a sensor, a few workpieces can be found out of them. However, it is actually difficult, with respect to the found plural workpieces, to decide an order of taking out the workpieces properly so as to take out the workpieces in order from one at the top, and smoothly take out the workpieces one after another.

Factor 2: Workpieces which could not be found by the sensor (hereinafter referred to as "unfound workpieces") are obstacles in taking out the other workpieces. In other words, it is likely that, when taking-out means (robot) approaches a workpiece which it is about to take out next, the unfound workpieces interfere with a robot hand or the like.

It is considered that such factors can be overcome for the time being by finding and referring to height distribution in an existing range of the workpieces. However, a problem of resolution in height distribution measurement arises when measurement based upon the height distribution is actually applied to the workpieces. For example, when data of the height distribution is created in a practical time with respect to a relatively large existing area of workpieces as large as 1 m squares, it is inevitable that the resolution falls. Thus, in the case in which object recognition is performed using only that information to take out the workpieces, required accuracy cannot be obtained, and the taking-out of the workpieces is hindered.

SUMMARY OF THE INVENTION

In the present invention, there are proposed, as specific methods of using height distribution measurement suitable for characteristics thereof, a form of using the height distribution measurement in provisional position and posture measurement, prior to final position measurement of workpieces by three-dimensional visual sensor mounted on a robot, and check of the possibility of interference between objects mounted on the robot and the workpieces, and the like.

More specifically, the present invention is applied to a workpiece taking-out apparatus, which measures a position and a posture of a workpiece with a three-dimensional visual sensor mounted on a robot and takes out the workpiece with the robot, and has means described below as a basic constitution thereof:

(a) height distribution acquisition means which acquires data of height distribution of an existing area of workpieces;

(b) positional information calculation means which calculates, on the basis of height information in the vicinity of a specific workpiece included in the data of height distribution acquired by the height distribution acquisition means, an approximate position or the approximate position and an approximate posture of the specific workpiece; and (c) robot position determination means which determines, on the basis of the result of the positional information calculation means, a measurement position of the robot for performing measurement for the specific workpiece with the three-dimensional visual sensor.

Here, the workpiece taking-out apparatus of the present invention may be one which repeatedly performs taking-out of workpieces by the robot. In that case, the height distribution acquisition means maybe one which reacquires the data of height distribution only for the vicinity of a place where a workpiece, which was taken out last time, existed.

In addition, the height distribution acquisition means preferably includes:

(d) means which sets a range for acquiring height distribution in advance.

The workpiece taking-out apparatus of the present invention can be applied to the case in which workpieces are contained in a container having an opening surrounded by an outer wall. In that case, the height distribution acquisition means may set an area inside the opening as a height distribution acquisition range. Note that, in order to set the area inside the outer wall of the container containing the workpieces, measurement of the outer wall of the container may be performed by the three-dimensional visual sensor or other sensors.

Moreover, in all the above-mentioned cases, the workpiece taking-out apparatus can be provided with:

(e) means which judges, from a relation between the data of height distribution and an existing range of objects mounted on the robot, a risk of interference between the mounted objects and any one of the plurality of workpieces when the robot moves to the measurement position.

In addition, the workpiece taking-out apparatus can be provided with:

(f) means which judges, from a relation between the data of height distribution and an existing range of objects mounted on the robot, a risk of interference between the mounted objects and any one of the workpieces other than the specific workpiece when the robot moves to a taking-out position for taking out the specific workpiece. It is more preferable that both the means of (e) and (f) are provided.

According to the present invention, it is possible to use the height distribution measurement in a form in which the problem of resolution does not hinder the measurement, and cause the height distribution measurement to play a useful role in actual taking-out of workpieces.

BRIEF DESCRIPTION OF THE DRAWINGS

The above-described objects and characteristics and other objects and characteristics of the present invention will be apparent from the following description of an embodiment with reference to the accompanying drawings. In the accompanying drawings.

DETAILED DESCRIPTION OF THE PREFERRED EMBODIMENTS

Figure 1:
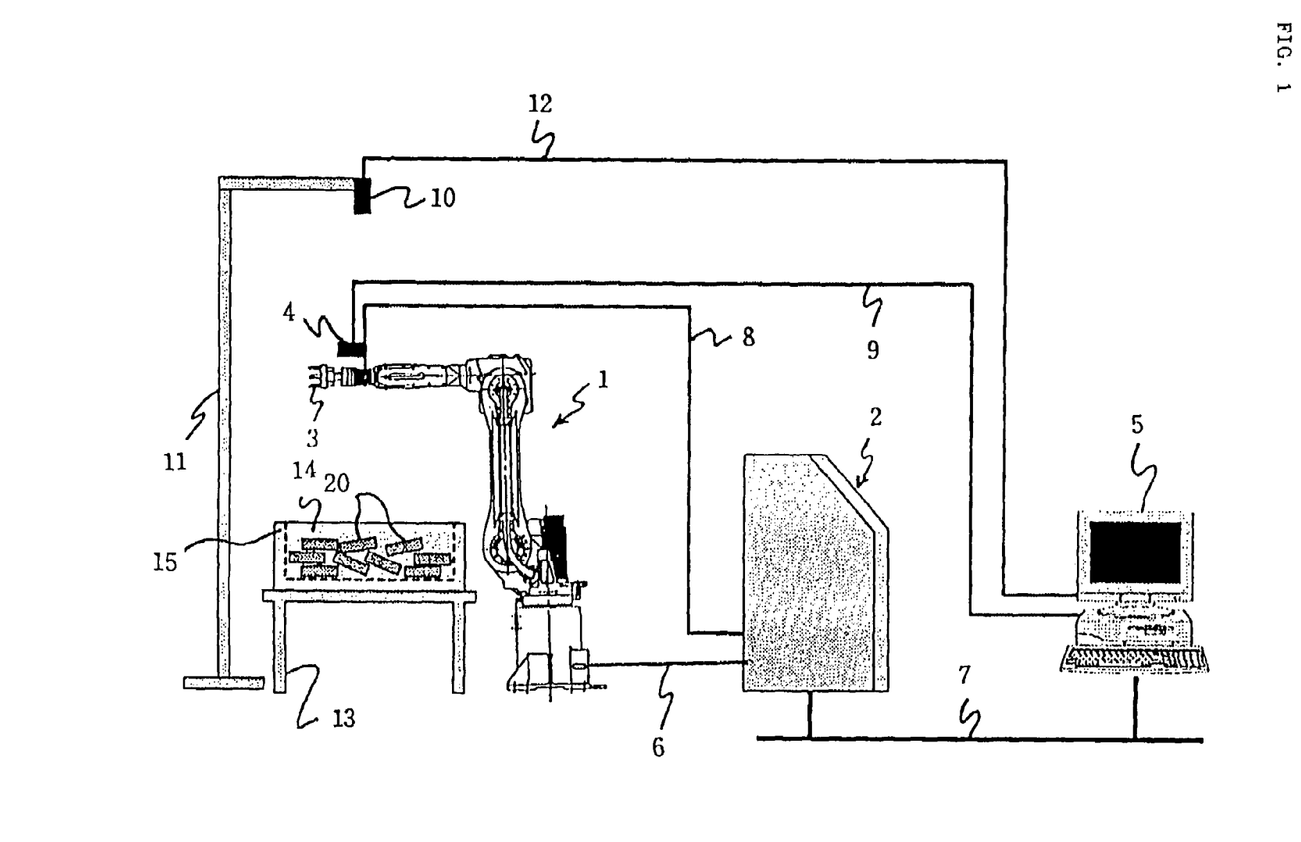
FIG. 1 is a diagram showing an overall arrangement of a workpiece taking-out apparatus in accordance with an embodiment of the present invention.

FIG. 1 is a diagram showing an overall arrangement of a workpiece taking-out apparatus in accordance with one embodiment the present invention. Reference numeral 1 denotes a robot (body mechanism unit) which is connected to a robot controller 2 by a cable 6. Movements of the robot 1 are controlled by the robot controller 2. A hand 3 and a three-dimensional visual sensor (sensor head) 4 are attached to the end portion of an arm of the robot 1. The hand 3 is connected to the robot controller 2 by a cable 8, and opening and closing movements thereof are controlled by the robot controller 2.

The three-dimensional visual sensor (sensor head) 4 is a well-known sensor in which a projector, which projects so-called pattern light such as slit light or spot light, and a video camera, which detects reflected light, are combined.

The three-dimensional visual sensor 4 is connected to a personal computer 5 by a cable 9. The personal computer 5 controls a sensing operation (projection of light, image snap, etc.) by the three-dimensional visual sensor 4. In addition, the personal computer 5 processes a light detection signal (here, a video signal) obtained by sensing (including usual snap by a camera) and sends required information to the robot controller 2 via the Ethernet ® 7.

Moreover, in the apparatus, a range finder 10 is arranged in an appropriate place using a stand 11. As it is well known, the range finder 10 is a measuring instrument which emits an ultrasonic wave or the like to a designated direction, detects a reflected wave of an object, and performs measurement on the basis of time required from the emission to the detection. Control of a range finding direction (direction of emitting an ultrasonic wave or the like), processing of a detection signal, and the like by the range finder 10 are performed by software processing in the personal computer 5 which is connected to the range finder 10 by a cable 12.

In this embodiment, workpieces to be taken out by the robot 1 are a large number of workpieces 20 which are placed in an unpackaged state in a basket-like container 14 which is supplied onto a table 13 placed in a predetermined position. The container 14 has an outer wall 15 and is provided with an opening surrounded by the outer wall 15. A shape of the opening is assumed to be rectangular here, but, in general, the shape is not particularly limited. A size of the outer wall 15 is small enough such that an inner area thereof (corresponding to the opening) is within a measurable range of the range finder 10 and within a visual field of the camera of the visual sensor 4.

Figure 2:
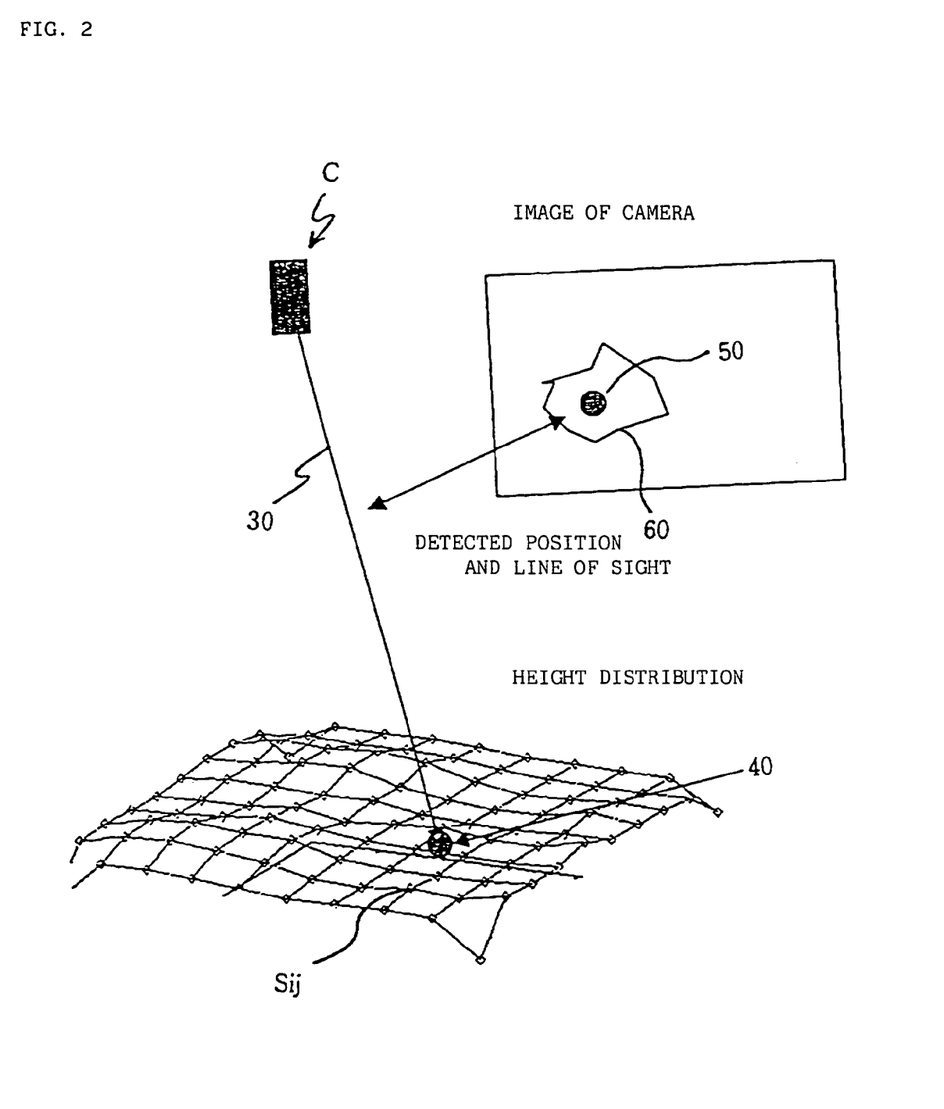
FIG. 2 is a diagram illustrating how a position of a workpiece detected by a camera is found from an intersection of a line of sight with respect to the workpiece and height distribution (border of the existing area of workpieces)
Figure 3:
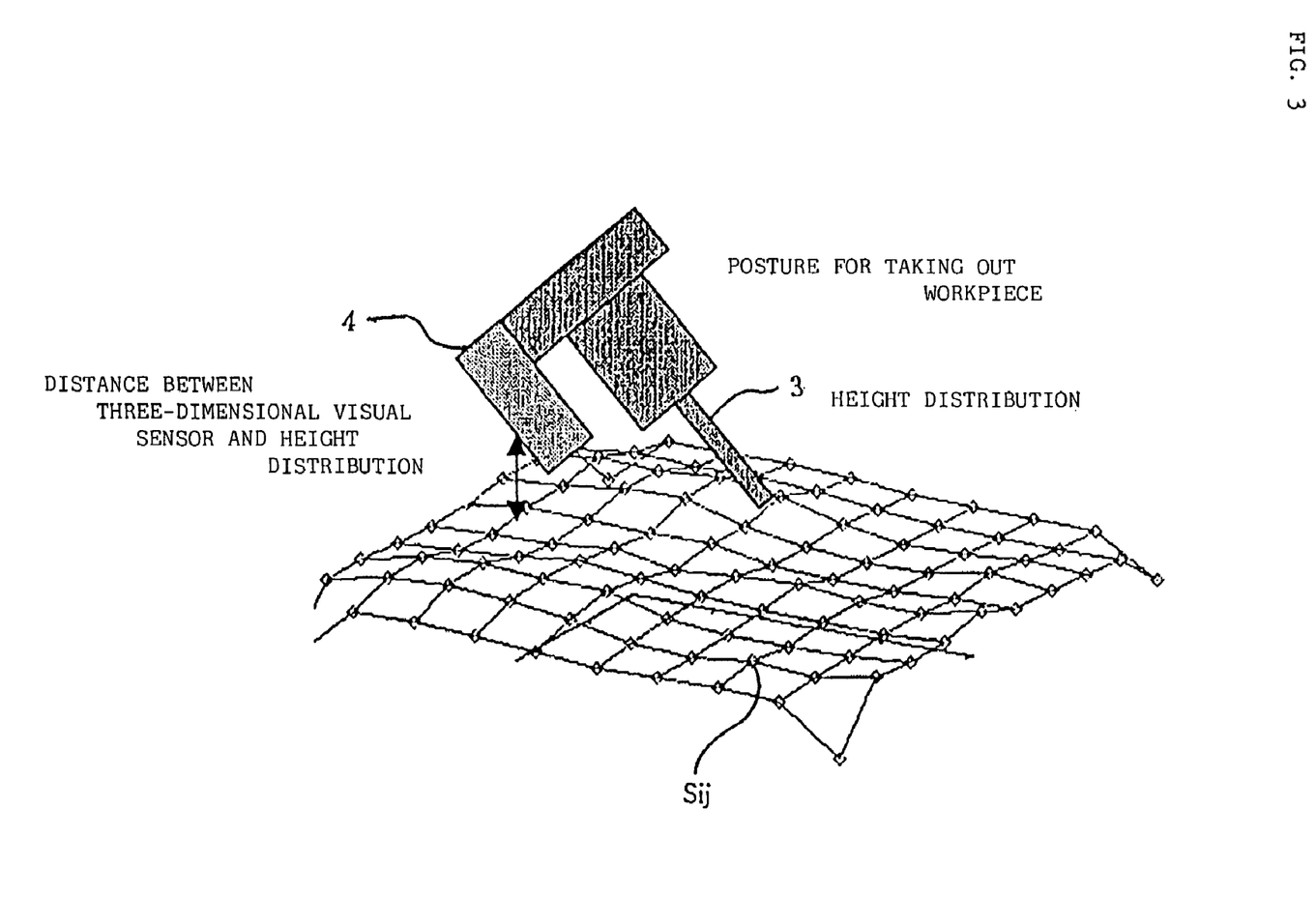
FIG. 3 is a diagram illustrating check of the possibility of interference between the height distribution and a three-dimensional visual sensor (sensor head)

As described above, in this embodiment, the "existing range of workpieces" is the entire area inside the opening of the container 14. In this embodiment, with the above-described system constitution, the workpieces 20 in the container 14 are taken out one after another using the robot 1 equipped with the hand 3. An outline of a processing procedure in that case will be described with reference to a flowchart of FIG. 4. In addition, FIGS. 2 and 3 will also be referred to according to circumstances in the description. FIG. 2 is a diagram illustrating how a position of a workpiece detected by a camera is found from an intersection of a line of sight with respect to the workpiece and height distribution (border of the existing area of workpieces). FIG. 3 is a diagram illustrating check of the possibility of interference between the height distribution and a three-dimensional visual sensor (sensor head).

Figure 4:
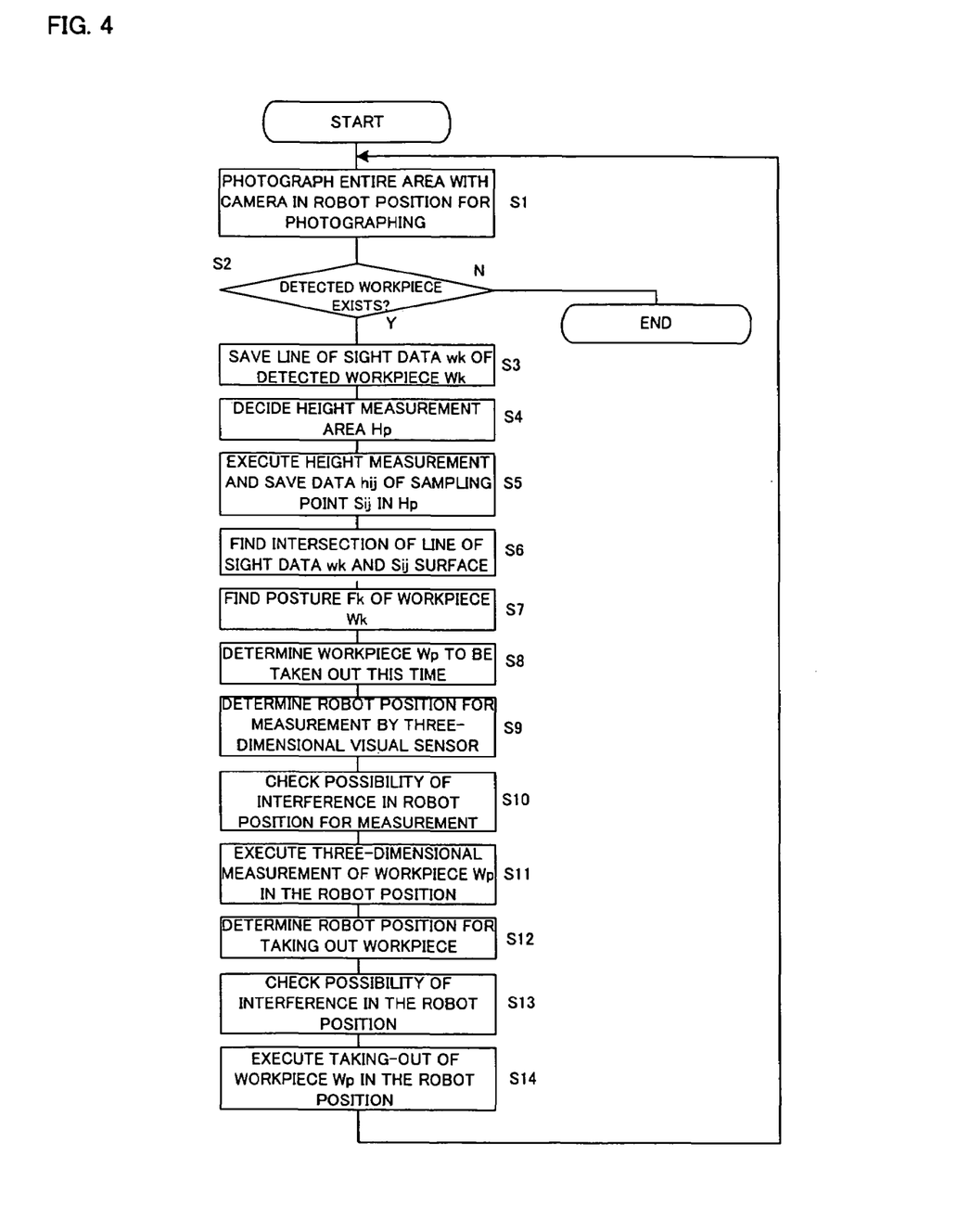
FIG. 4 is a flowchart describing a processing procedure in the embodiment.

Note that it is assumed that calibration of the visual sensor 4, calibration of the range finger 10, and preparation for data acquisition or the like for converting detection results of the visual sensor 4 and the range finder 10 into a robot coordinate system, which is fixed in a workpiece space, have been completed. The point of each step in the flowchart shown in FIG. 4 is as described below.

Step S1: In a robot position for snap, the workpiece taking-out apparatus performs snap of an entire area (area including the entire container 14) to capture an image in the personal computer 5. As the robot position for snap, "a position allowing a visual field of the camera of the visual sensor 4 to cover the entire container 14 with some room" is instructed to the robot controller 2 in advance.

Step S2: The workpiece taking-out apparatus attempts detection of workpieces according to image processing in the personal computer 5, and when one or more workpieces Wk can be detected, processing proceeds to step S3. If no workpiece is detected, the workpiece taking-out apparatus judges that the container 14 is empty (there is no workpiece which has not been taken out) to end the processing.

Step S3: The workpiece taking-out apparatus calculates a line of sight of the camera of the visual sensor 4 for a representative point of each workpiece Wk (workpiece Wk may be one) (e.g., an area centroid on an image of the workpiece Wk) in the personal computer 5 using calibration data or the like of the camera and saves data wk of the line of sight in a memory in the personal computer 5.

Step S4: The workpiece taking-out apparatus decides a height measurement area Hp for height measurement by the range finder 10. Here, the suffix p of "Hp" represents height measurement of pth time (p=1, 2 . . . ). As a method of deciding the area Hp in the height measurement of pth time, any one of the following methods can be used.

Method 1: An area H1=H2= . . . common for each time is set in advance. The area H1 is set so as to be substantially fit, for example, the opening of the container 14 (inside of the outer wall 15).

Method 2: In step S4 of the first time, the outer wall 15 of the container 14 is detected by the image processing in the personal computer 5 to decide an inside area thereof (corresponding to the opening) as the area H1. Thereafter, this area is adopted as the common area H1=H2= . . . for each time.

Method 3: In step S4 of each time, the outer wall 15 of the container 14 is detected by the image processing in the personal computer 5 to decide an inside area thereof (corresponding to the opening) as the area Hp. According to this method, the area Hp can be set properly even if a position of the container 14 changes more or less. Note that another sensor (not shown) set in a place suitable for the detection of the outer wall 15 of the container 14 may be used.

Method 4: An area 1 is decided only for the area H1 of the first time by the method 1 or the method 3. In the second or subsequent times, only the vicinity of a workpiece taken out last time is set as the area Hp (P≧2). Here, as a range (size) of the "vicinity", a range, in which a change in height due to the taking-out of a workpiece of the last time is predicted, is set in advance. For example, it is assumed that a two-dimensional position (position of a representative point) of the workpiece taken out last time is $(x_{p-1}, y_{p-1})$, and a range surrounded by four points, $(x_{p-1}-\Delta, y_{p-1}-\Delta)$, $(x_{p-1}+\Delta, y_{p-1}-\Delta)$, $(x_{p-1}+\Delta, y_{p-1}+\Delta)$, and $(x_{p-1}-\Delta, y_{p-1}+\Delta)$ is Hp. According to this method, time required for height measurement of each time can be reduced.

Step S5: The workpiece taking-out apparatus executes height measurement. In measuring a height, while scanning a measurement direction of the range finder 10 stepwise according to an instruction from the personal computer 5, the workpiece taking-out apparatus collects height data hij of a large number of sampling points (measurement points) Sij as shown in FIG. 2. A scanning range is decided so as to cover the area Hp with some room. For example, in the case in which the methods 1 to 3 are adopted, it is sufficient to set the scanning range in advance so as to cover the entire container 14 with some room. In addition, in the case in which the method 4 is adopted, it is sufficient to change the scanning range according to fluctuation in the area Hp.

The workpiece taking-out apparatus saves data in the area Hp among the data hij collected in this way. In the case in which the method 4 is adopted, the workpiece taking-out apparatus updates height data in the area Hp in the second or subsequent steps and keeps the other height data without updating the same.

Step S6: As shown in FIG. 2, the workpiece taking-out apparatus finds a position of an intersection 40 of line of sight data wk representing a line of sight 30 of a camera C for each detected workpiece (see step S3) and an "Sij surface". Here, the "Sij surface" means a surface, which is generated by connecting a large number of sampling points (height measurement points) Sij in a network shape, and can be found from data of hij in the personal computer 5 by calculation. On an image snapped by the camera C, an image position 50 of the intersection 40 is on a work image 60 as also shown in FIG. 2.

Note that the determination of a position of the intersection 40 found as described above is for obtaining a general three-dimensional position of each workpiece in preparation for main measurement (step S11), and high accuracy is not required.

Step S7: The workpiece taking-out apparatus finds an approximate posture Fk for each detected workpiece. The approximate posture Fk can be figured out from height data around and in the vicinity of the position of the intersection 40 found in step S6. A range (size) of "around and in the vicinity" is set in advance.

Step S8: The workpiece taking-out apparatus determines a workpiece to be taken out this time for each detected workpiece on the basis of position data and the posture Fk of the intersection 40. A rule therefore is set in advance. For example, a rule described below is applied.

(1) The workpiece taking-out apparatus selects a workpiece having a highest position of the intersection 40.

(2) The workpiece taking-out apparatus checks "whether or not the posture Fk is inappropriate (e.g., cannot be gripped by the hand)" and "whether or not a position other than the height is inappropriate (e.g., position closely attached to the outer wall 15)" for the workpiece, and determines that the workpiece selected in above (1) is a workpiece to be taken out this time unless the posture Fk and the position are inappropriate.

(3) If inappropriate, the workpiece taking-out apparatus selects a workpiece having the second highest position of the intersection 40 and performs the check of above (2). In the same manner; the workpiece taking-out apparatus repeats the check for the other workpieces to determine that a workpiece, which has a position of the intersection 40 as high as possible under the conditions clearing the check of (2), is a workpiece to be taken out this time.

Step S9: The workpiece taking-out apparatus calculates an appropriate robot position close to a position of the workpiece to be taken out this time (the position of the intersection 40) and decides a robot position (including a posture) where the main measurement by the three-dimensional visual sensor is performed. The workpiece taking-out apparatus receives data necessary for the calculation from the personal computer 5 and performs the calculation in the robot controller 2.

Step S10: The workpiece taking-out apparatus checks the possibility of interference with objects mounted on the robot (in particular, the three-dimensional visual sensor) for the measurement position of the three-dimensional visual sensor decided in step S9. For this purpose, for example, the workpiece taking-out apparatus sets in advance a spatial area, which covers an area occupied by the mounted objects with some room, in the memory of the robot controller 2 as data Vf representing the spatial area on a face plate coordinate system which is set at the end portion of an arm of the robot. The workpiece taking-out apparatus converts this data Vf into a spatial position in the measurement position of the three-dimensional visual sensor (e.g., data on the robot coordinate system) Vr.

The workpiece taking-out apparatus can check the possibility of interference by comparing this result with the data of the Sij surface. For example, the workpiece taking-out apparatus sets in advance a small threshold value for a distance between the spatial area represented by the data Vr and the Sij surface, and if a distance equal to or more than the threshold value is secured, judges that there is no possibility of interference, and processing proceeds to step S11. In addition, if only a distance less than the threshold value is secured, the workpiece taking-out apparatus judges that there is the possibility of interference. Note that, if it is judged that there is the possibility of interference, for example, the workpiece taking-out apparatus revises the measurement position of the three-dimensional visual sensor upward by a degree of the threshold value, and processing proceeds to step S11.

Step S11: The workpiece taking-out apparatus moves the robot to the robot position for measurement decided in step S10 and performs measurement of a three-dimensional position and posture for the workpiece to be taken out this time. A method of measurement will not be described because it is well known. Note that, since the measurement performed here can be performed by the three-dimensional visual sensor in the close proximity to the workpiece to be taken out this time, it is possible to expect high accuracy.

Step S12: The workpiece taking-out apparatus determines a robot position (including a posture) for taking out a workpiece on the basis of the three-dimensional position and posture of the workpiece found in step S11.

Step S13: The workpiece taking-out apparatus checks the possibility of interference with the objects mounted on the robot (in particular, the three-dimensional visual sensor) for the robot position for taking out a workpiece decided in step S12. As a specific method, it is sufficient to use the same method as described for the robot position for measurement in step S10. In other words, as shown in FIG. 3, data representing the range occupied by the visual sensor 4 or a range slightly larger than that range is set in the memory of the robot controller 2 in advance (the above-described data Vf can also be used). The workpiece taking-out apparatus can check the possibility of interference by converting this data into spatial position data in the robot position for taking out a workpiece and comparing it with the data of the Sij surface. Then, the workpiece taking-out apparatus confirms that there is no possibility of interference in the same manner as step S10, and processing proceeds to step S14.

However, if it is judged that there is the possibility of interference, although not described in the flowchart, the processing returns to step S8, determines that another workpiece as a workpiece to be taken out this time, and executes steps S9 to S13 again. Then, the processing repeats steps S8 to S13 until the check of interference in step S13 can be cleared. In the event that the processing could not proceed to step S14 for all the detected workpieces, the work taking-out apparatus considers this state as system abnormality and outputs an alarm to end the processing (not described in the flowchart).

Step S14: The workpiece taking-out apparatus moves the robot to the robot position for taking out a workpiece decided in step S12 and executes taking-out of a workpiece. When the taking-out of a workpiece is completed (open the hand 3 in an appropriate place to release a workpiece), the workpiece taking-out apparatus returns to step S1. Thereafter, in accordance with the above description, the workpiece taking-out apparatus executes the steps to take out workpieces from the container 14 one after another. When all the workpieces in the container 14 has been taken out, naturally, the processing proceeds to "end" from step S2, and the processing is finished.

According to the present invention, taking-out of workpieces placed in an unpackaged state in a container or the like can be realized steadily by using the characteristics of the height distribution measurement reasonably. In addition, information on height distribution acquired by the height distribution means is used in a range suitable for accuracy and characteristics thereof. As a result, it becomes possible to take out workpieces preferentially, for example, from one in a highest position with respect to a group of unpackaged workpieces. Moreover, in taking out the workpieces, a relation between the height distribution of workpieces around a robot tool or the like and the robot tool or the like is checked in advance, whereby it becomes possible to perform taking-out of the workpieces while preventing the workpieces and the robot tool or the like from coming into contact with each other.

What is claimed is:

1. A workpiece taking-out apparatus, which measures a position and a posture of a workpiece with a three-dimensional visual sensor mounted on a robot and takes out the workpiece with the robot, said workpiece taking-out apparatus comprising:

height distribution acquisition means which acquires data of height distribution of an existing area of workpieces;

positional information calculation means which calculates, on the basis of height information in the vicinity of a specific workpiece included in the data of height distribution acquired by said height distribution acquisition means, an approximate position or the approximate position and an approximate posture of the specific workpiece; and robot position determination means which determines a measurement position of said robot for performing measurement for the specific workpiece with said three-dimensional visual sensor.

2. The workpiece taking-out apparatus according to claim 1, wherein taking-out of workpieces by said robot is performed repeatedly, and said height distribution acquisition means reacquires the data of height distribution only for the vicinity of a place where a workpiece taken out last time existed.

3. The workpiece taking-out apparatus according to claim 1, wherein said height distribution acquisition means comprises means which sets a range for acquiring height distribution in advance.

4. The workpiece-taking out apparatus according to claim 1, wherein the plurality of workpieces are contained in a container, said container has an opening surrounded by an outer wall of said container, and said height distribution acquisition means sets an area inside the opening as a height distribution acquisition range.

5. The workpiece-taking out apparatus according to any one of claims 1 to 4, further comprising means which judges, from a relation between the data of height distribution and an existing range of objects mounted on said robot, a risk of interference between said mounted objects and any one of the plurality of workpieces when said robot moves to the measurement position.

6. The workpiece-taking out apparatus according to claim 5, further comprising means which judges, from a relation between the data of height distribution and an existing range of objects mounted on said robot, a risk of interference between said mounted objects and any one of the workpieces other than the specific workpiece when said robot moves to a taking-out position for taking out the specific workpiece.

7. The workpiece-taking out apparatus according to any one of claims 1 to 4, further comprising means which judges, from a relation between the data of height distribution and an existing range of objects mounted on said robot, a risk of interference between said mounted objects and any one of the workpieces other than the specific workpiece when said robot moves to a taking-out position for taking out the specific workpiece.

* * * * *

UNITED STATES PATENT AND TRADEMARK OFFICE
CERTIFICATE OF CORRECTION

PATENT NO. : 7,203,573 B2 Page 1 of 1
APPLICATION NO. : 10/733308
DATED : April 10, 2007
INVENTOR(S) : Kazunori Ban et al.

It is certified that error appears in the above-identified patent and that said Letters Patent is hereby corrected as shown below:

On title page (56)

Page 2, Column 2 (Other Publications), Line 5, change "Ep" to --EP--.

In the specification:

Column 2, Line 30, change "maybe" to --may be--.

Column 8, Line 49, change "work pieces" to --workpieces--.

Signed and Sealed this

Third Day of July, 2007

JON W. DUDAS
*Director of the United States Patent and Trademark Office*